US008699519B2

(12) United States Patent
Muramoto et al.

(10) Patent No.: US 8,699,519 B2
(45) Date of Patent: Apr. 15, 2014

(54) TRANSMISSION RATE CONTROL DEVICE AND TRANSMISSION RATE CONTROL METHOD

(75) Inventors: Eiichi Muramoto, Kanagawa (JP); Takahiro Yoneda, Tokyo (JP); Kazunobu Konishi, Osaka (JP)

(73) Assignee: Panasonic Corporation, Osaka (JP)

( * ) Notice: Subject to any disclaimer, the term of this patent is extended or adjusted under 35 U.S.C. 154(b) by 309 days.

(21) Appl. No.: 13/119,296

(22) PCT Filed: Aug. 11, 2009

(86) PCT No.: PCT/JP2009/003863
§ 371 (c)(1),
(2), (4) Date: Mar. 16, 2011

(87) PCT Pub. No.: WO2010/032370
PCT Pub. Date: Mar. 25, 2010

(65) Prior Publication Data
US 2011/0170417 A1  Jul. 14, 2011

(30) Foreign Application Priority Data

Sep. 19, 2008  (JP) ................................. P2008-240986

(51) Int. Cl.
*H04W 28/10* (2009.01)

(52) U.S. Cl.
USPC ......................................................... 370/468

(58) Field of Classification Search
USPC .................................. 370/238; 709/219, 231
See application file for complete search history.

(56) References Cited

U.S. PATENT DOCUMENTS

| 7,430,219 | B2 | 9/2008 | Itoh et al. | |
|---|---|---|---|---|
| 2003/0053410 | A1* | 3/2003 | Williams et al. | 370/207 |
| 2005/0005020 | A1* | 1/2005 | Rey et al. | 709/231 |
| 2007/0008883 | A1* | 1/2007 | Kobayashi | 370/230 |

(Continued)

FOREIGN PATENT DOCUMENTS

| JP | 2004-72720 A | 3/2004 |
|---|---|---|
| JP | 2005347927 A | 12/2005 |
| WO | 2008/041434 A1 | 4/2008 |

OTHER PUBLICATIONS (Equation based congestion control for Unicast Applications), M. Handley et al.*

(Continued)

*Primary Examiner* — Anh-vu Ly
*Assistant Examiner* — Hashim Bhatti
(74) *Attorney, Agent, or Firm* — Pearne & Gordon LLP

(57) ABSTRACT

A first communication terminal which communicates with a second communication terminal through a best effort network includes: a communication history storage unit in which a communication history is stored for each of the communication terminals; and a round-trip delay time calculation unit which calculates a round-trip delay time that occurs in a communication with the second communication terminal. The second communication terminal includes a target loss event rate calculation unit which calculates a target loss event rate that is to be set by the first communication terminal in a communication with the second communication terminal, based on a past transmission rate that is recorded in the communication history and has been realized in the communication with the second communication terminal, and on the round-trip delay time that occurs in the communication with the second communication terminal. The first communication terminal changes a transmission rate which is set at the present time to a target transmission rate which is calculated based on the target loss event rate and the round-trip delay time. According to the transmission rate control device, when it is determined that the bandwidth that is estimated to be available in a communication through the network is rapidly changed, the transmission rate can be changed to a target bit rate in a short time period.

18 Claims, 8 Drawing Sheets

(56) References Cited

U.S. PATENT DOCUMENTS

2010/0074113 A1    3/2010  Muramoto et al.
2013/0028088 A1*   1/2013  Do et al. .................. 370/235

OTHER PUBLICATIONS

Sakakura et al; "A Proposal of TCP Friendly and Efficient Rate Control Methods with Less Throughput Fluctuation for CBR Traffics", IEICE Technical Report, vol. 14, No. 340, Oct. 8, 2004, pp. 1-6.

Handley et al; "TCP Friendly Rate Control (TFRC): Protocol Specification" Netword Working Group, RFC 3448, Jan. 2003 pp. 1-24.

Floyd et al; "Equation-Based Congestion Control for Unicast Applications", AT&T Center for Internet Research at ICSI, pp. 43-56.

International Search Report for PCT/JP2009/003863 dated Sep. 15, 2009.

* cited by examiner

TRANSMISSION RATE CONTROL DEVICE AND TRANSMISSION RATE CONTROL METHOD

TECHNICAL FIELD

The present invention relates to a transmission rate control device and a transmission rate control method which control a transmission rate in accordance with a bandwidth that is estimated to be available in a communication through a best effort network.

BACKGROUND ART

Recently, a technique for transmitting streaming data such as video and audio data in a real time from a transmission terminal to a reception terminal through a best effort network which is typified by the Internet is becoming widespread. In data transmission through the best effort network, when the transmission rate which is set in a transmission terminal is larger than the network bandwidth, congestion occurs on the network. Therefore, a transmission terminal changes the transmission rate of streaming data in accordance with an available bandwidth which is changed by the congestion situation, the channel situation, and the like of a network between the transmission terminal and a destination terminal.

As a congestion control technique specialized for real-time data transmission through a best effort network, the TFRC (TCP Friendly Rate Control) disclosed in Non-Patent Literature 1 is known. A terminal using the TFRC calculates a transmission rate X by using following Expression (1) from the RTT (Round Trip Time) showing the round-trip delay time of data between terminals, the packet loss situation, and the like.

[Exp. 1]

$$X = \frac{8s}{R\sqrt{2bP/3} + \text{T\_RTO}(3 \times \sqrt{3bP/8}) \times P \times (1 + 32P^2)} \quad (1)$$

In Expression (1) above, X [bps] is a transmission rate corresponding to a bandwidth that is estimated to be available in a communication through a network, s is the packet size [byte], R is the RTT [sec.], and b is a constant. T_RTO is a value indicating the time-out by the TCP protocol, and 4R is used as the value. P is the loss event rate indicating the packet loss situation. The loss event rate P is a loss rate which is defined so that the TFRC performs a smooth transmission rate control. The packet loss which occurs in one round trip time is counted as one loss event. The rate is calculated by using the history of the loss event.

FIG. 8 is a graph showing a method which is disclosed in Non-Patent Literature 2, and in which the loss event rate is calculated by using the history of loss events. The ordinate 21 shown in FIG. 8 indicates a sequential number in a packet, and the abscissa 22 indicates an elapse of time. The plot 23 of arrival packets (□, Packet Arrival) indicates the time when a packet arrives at a reception terminal, and the sequential number at the time. The plot 24 of lost packets (x, Packet Lost) indicates the time when a loss event occurs, and the sequential number at the time.

The arrival packet number 25 from the latest loss indicates the number of packets which arrive at the reception terminal after occurrence of the latest event loss. The loss event intervals $26_1$ to $26_8$ indicate the number of packets which arrive at the reception terminal between loss events. The weights $27_1$ to $27_8$ indicate weights to be multiplied with the corresponding loss event intervals 26. The weighted event losses $28_1$ to $28_8$ are obtained by multiplying the loss event interval 26 with the weight 27.

In the TFRC, as shown in FIG. 8, the reciprocal of a weighted loss event interval which is obtained by weighted averaging the loss event intervals 26 of past eight generations is calculated as the loss event rate (P). The loss event interval is obtained by (loss event interval $26_1 \times$ weight $27_1 + \ldots +$ loss event interval $26_8 \times$ weight $27_8$)/(weight $27_1 + \ldots +$ weight $27_8$). In the TFRC, as described above, a weighted loss event rate which is calculated by using the history of the loss event is used as one of parameters, whereby the transmission rate is controlled so as to be smoothly changed. From the opposite viewpoint, when the bandwidth which is available in a communication with a destination terminal is rapidly changed, however, the TFRC cannot immediately change the transmission rate to an appropriate value.

The above-described technique is used in, for example, a video conference system. FIG. 9 shows an example of the configuration of a video conference system which uses a best effort network. In the video conference system shown in FIG. 9, terminals 11, 12, 13 which transmit and receive streaming data such as video and audio data are disposed. In each of the terminals, the transmission rate is set by using the above-described TFRC.

The terminals 11, 12 are connected to each other so as to be communicable through a domestic network ND. The terminal 13 is connected to the terminals 11, 12 so as to be communicable through the domestic network ND, an overseas line L, and an overseas network NA. In the example described below, both the domestic network ND and the overseas network NA can realize broad bandwidth transmission of, for example, 10 Mbps. In transmission through the overseas line L, however, the overseas line L is a bottleneck, and the bandwidth is limited to about 2 Mbps.

In the video conference system, the transmission rate is set in accordance with the bandwidth which is narrowest among the bandwidths used in a communication between terminals. In the case where the terminals 11, 12, 13 perform a three-way communication, for example, the terminals set the transmission rate in accordance with the actual performances of communications through the domestic network ND, the overseas line L, and the overseas network NA. In this example, the domestic network ND and the overseas network NA can realize transmission of about 10 Mbps, but the overseas line L can realize only transmission of about 2 Mbps. Therefore, the terminals set the transmission rate to 2 Mbps.

It is assumed that, in a situation where the three-way communication is performed by the terminals 11, 12, 13, the terminal 13 interrupts communication, and the three-way communication is switched to a two-way communication between the terminals 11, 12 using only the domestic network ND. At this time, the terminals 11, 12 set the transmission rate in accordance with the actual performance of the communication through only the domestic network ND. In this example, the domestic network ND can realize transmission of about 10 Mbps. Therefore, the terminals 11, 12 change the transmission rate from 2 Mbps to 10 Mbps.

CITATION LIST

Patent Literature

Patent Literature 1: JP-2004-72720A

Non-Patent Literature

Non-Patent Literature 1: M. Handley et al., "TCP Friendly Rate Control (TFRC): Protocol Specification", RFC 3448, January 2003, pp. 1-24

Non-Patent Literature 2: S. Floyd et al., "Equation-Based Congestion Control for Unicast Applications", August 2000, pp. 1-14

SUMMARY OF THE INVENTION

Technical Problem

As described above, in the transmission rate control using the TFRC, the transmission rate is smoothly changed. In the video conference system shown in FIG. 9, even when the terminal 13 interrupts communication and as a result the bandwidth which is available in the communication between the terminals 11, 12 is rapidly increased, therefore, the transmission rate in the terminals 11, 12 is not immediately moved to a high bit rate. During a period until the rate is moved to the high bit rate, the available bandwidth is not matched with the transmission rate, and the network bandwidth is not sufficiently used. Therefore, it is preferable that the time period which elapses before the rate is moved to a high bit rate is short.

In the case where the available bandwidth is rapidly increased, when the transmission rate is rapidly moved to a high bit rate without using the TFRC for the transmission rate control, packets are congested, and a packet loss which is larger than an assumed loss is caused. As a result, an image and sound in the reception terminal are disturbed.

It is an object of the invention to provide a transmission rate control device and transmission rate control method in which, when the bandwidth that is estimated to be available in a communication through a network is rapidly changed, the transmission rate can be changed to a target bit rate in a short time period.

Solution to Problem

The present invention provides a transmission rate control device which is to be used in a transmission rate control system that controls a transmission rate in accordance with a bandwidth that is estimated to be available in a communication between two communication terminals through a best effort network, the transmission rate control device including: a communication history storage unit in which a communication history of communication that has been performed through the network is stored for each of communication terminals; a round-trip delay time calculation unit which calculates a round-trip delay time that occurs in a communication with a predetermined communication terminal through the network; a target transmission rate calculation unit which calculates a target transmission rate based on a target loss event rate and the round-trip delay time that is calculated by the round-trip delay time calculation unit and occurs in the communication with the predetermined communication terminal, the target loss event rate being calculated by the predetermined communication terminal based on a past transmission rate that is recorded in the communication history and has been realized in the communication with the predetermined communication terminal, and the round-trip delay time that is calculated by the round-trip delay time calculation unit and occurs in the communication with the predetermined communication terminal; and a transmission rate control unit which controls the transmission rate to be changed from a transmission rate which is set at a present time to the target transmission rate which is calculated by the target transmission rate calculation unit.

The present invention provides a transmission rate control device which controls a transmission rate in accordance with a bandwidth that is estimated to be available in a communication through a best effort network, the transmission rate control device including: a communication history storage unit in which a communication history of communication that is performed through the network is stored for each of communication terminals; a round-trip delay time calculation unit which calculates a round-trip delay time that occurs in a communication with a communication terminal through the network; a target transmission rate calculation unit which calculates a target transmission rate which is set in a communication with a predetermined communication terminal, based on a past transmission rate that is recorded in the communication history and realized in the communication with the predetermined communication terminal, and on the round-trip delay time that is calculated by the round-trip delay time calculation unit and occurs in the communication with the predetermined communication terminal; and a transmission rate control unit which changes a transmission rate which is set at a present time to the target transmission rate.

The present invention provides a transmission rate control method which is performed in a transmission rate control system that controls a transmission rate in accordance with a bandwidth that is estimated to be available in a communication between two communication terminals through a best effort network, transmission rate control method including: calculating, by a first communication terminal which communicates with a second communication terminal through the network, a round-trip delay time that occurs in the communication with the second communication terminal through the network; calculating, by the second communication terminal, a target loss event rate based on a past transmission rate that has been realized in the communication with the second communication terminal which is performed by the first communication terminal, and on a round-trip delay time that is calculated by the first communication terminal; calculating, by the first communication terminal, a target transmission rate based on the target loss event rate that is calculated by the second communication terminal, and the round-trip delay time; and controlling, by the first communication terminal, the transmission rate to be changed from a transmission rate which is set at a present time to the target transmission rate.

The present invention provides a transmission rate control method which controls a transmission rate in accordance with a bandwidth that is estimated to be available in a communication through a best effort network, the transmission rate control method including: calculating a round-trip delay time that occurs in the communication with a communication terminal through the network; calculating a target transmission rate which is to be set in a communication with a predetermined communication terminal based on a past transmission rate that has been realized in a communication with the predetermined communication terminal, and on the round-trip delay time that occurs in the communication with the predetermined communication terminal; and changing a transmission rate which is set at a present time to the target transmission rate.

Advantageous Effects of the Invention

According to the transmission rate control device and the transmission rate control method of the invention, when the bandwidth that is estimated to be available in a communication through a network is rapidly changed, the transmission rate can be changed to a target bit rate in a short time period.

DESCRIPTION OF EMBODIMENTS

Figure 1:
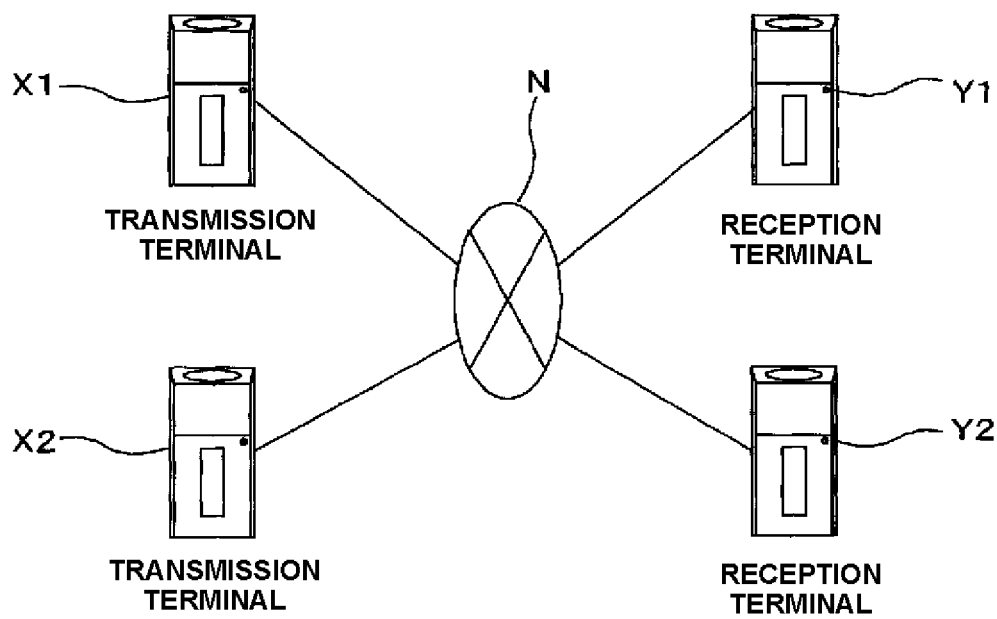
FIG. 1 shows a communication system in which transmission terminals X1, X2 and reception terminals Y1, Y2 are connected to a network N.

Hereinafter, embodiments of the invention will be described with reference to the drawings. In the embodiments, a communication system in which, as shown in FIG. 1, transmission terminals X1, X2 for transmitting streaming data, and reception terminals Y1, Y2 for receiving streaming data are connected to a best effort network N will be described. The transmission terminals X1, X2 and the reception terminals Y1, Y2 are communication terminals which use the technique of the TFRC (TCP Friendly Rate Control).

First Embodiment

Figure 2:
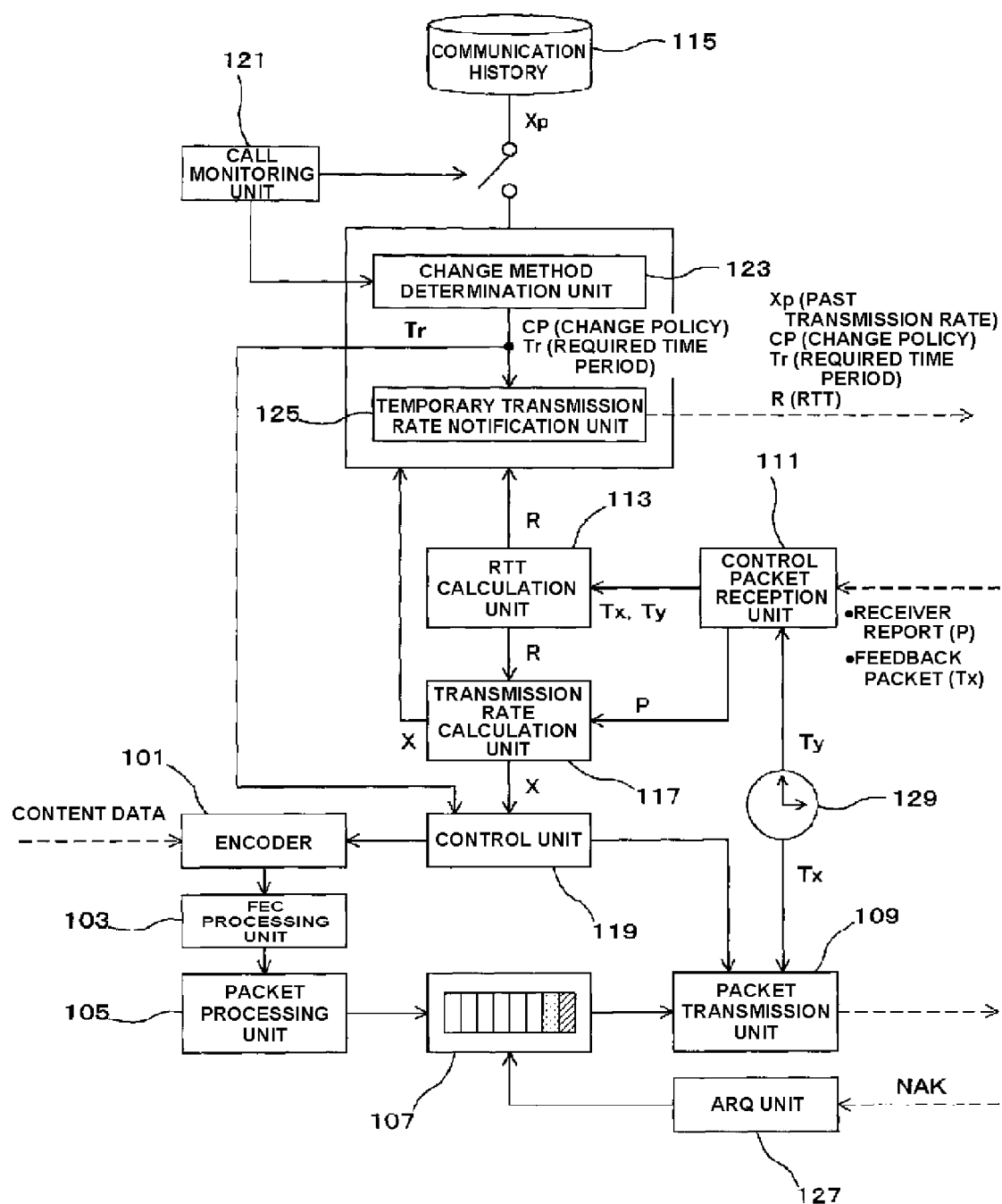
FIG. 2 is a block diagram showing the internal configuration of the transmission terminal X1 in a first embodiment.

FIG. 2 is a block diagram showing the internal configuration of the transmission terminal X1 in a first embodiment. As shown in FIG. 2, the transmission terminal X1 in the first embodiment includes an encoder 101, a redundant code processing unit (FEC processing unit) 103, a packet processing unit 105, a buffer 107, a packet transmission unit 109, a control packet reception unit 111, an RTT calculation unit 113, a communication history storage unit 115, a transmission rate calculation unit 117, a control unit 119, a call monitoring unit 121, a change method determination unit 123, a temporary transmission rate notification unit 125, an ARQ unit 127, and a clock 129.

The encoder 101 encodes content data such as video and audio data in accordance with a predetermined coding rate. The redundant code processing unit 103 generates a redundant code for enabling the reception terminal Y1 to perform error detection or error correction such as the FEC (Forward Error Correction), from the content data which are encoded by the encoder 101. Furthermore, the redundant code processing unit 103 adds the generated redundant code to the content data which are encoded by the encoder 101, and outputs the result.

The above-described redundant code is a code by an XOR calculation, a Reed-Solomon code, or the like. Alternatively, the generation of a redundant code by the redundant code processing unit 103 may be performed on a packet obtained by the packet processing unit 105 which will be described later. Moreover, the generated redundant code may be combined with the encoded content data into a single packet, or disposed in a packet which is different from that of the encoded content data.

The packet processing unit 105 packetizes data in which the redundant code is added to the content data encoded by the encoder 101, and stores the generated packet into the buffer 107. The buffer 107 temporarily accumulates packets which have not been transmitted to the network N. In accumulation of packets in the buffer 107, the packets may be accumulated in the generation sequence of the encoded contents and the redundant code, or accumulated in an interleaved manner.

The packet transmission unit 109 transmits the packets accumulated in the buffer 107, to the network N at the transmission rate which is instructed by the control unit 119. Information indicative of the packet transmission time $T_x$ which is used by the transmission terminal X1 to measure the round-trip delay time (hereinafter, referred to as "RTT") that is caused in a communication between the transmission and reception terminals through the network N is added to a part of the packets to be transmitted by the packet transmission unit 109. The packet to which the information indicative of the transmission time Tx is added is an RTP (Real-Time Transport Protocol) packet containing content data. Furthermore, the packet to which the information indicative of the transmission time Tx is added is an RTCP (Real-Time Transport Control Protocol) for controlling the transmission of an RTP packet, another control packet, or the like. The transmission time Tx is obtained from the clock 129 which is included in the transmission terminal X.

The control packet reception unit 111 receives a receiver report and feedback packet which are transmitted from the reception terminal Y1. The receiver report is an RTCP packet containing information related to the loss event rate P which is calculated by the reception terminal Y1. The transmission time Tx which is transmitted from the transmission terminal X is added to the feedback packet. The receiver report may contain the transmission time Tx which is transmitted from the transmission terminal X.

The RTT calculation unit 113 calculates the difference (=Rx−Tx) between the reception time Rx of the feedback packet which is received by the control packet reception unit 111, and the transmission time Tx which is added to the feedback packet, as the RTT.

The communication history storage unit 115 memorizes a communication history containing the maximum, minimum, and average values of each of the transmission rate, the loss rate, the loss event rate, and the round-trip delay time (RTT) of communications which have been performed in past times with communication terminals, for each of the communication terminals. The communication history storage unit 115 may memorize a dispersive power of each of the loss rate, the loss event rate, and the RTT. The statistical values recorded in the communication history storage unit 115 are not necessary to be those over the whole communication time period of the communication terminals, and may be those during a predetermined time period before the communication interruption, or those of each of communication time zones.

The transmission rate calculation unit 117 calculates the transmission rate by using Expression (1) which has been described in the paragraph of the background art, from the RTT calculated by the RTT calculation unit 113, the loss event rate P contained in the receiver report which is received by the control packet reception unit 111, and the like. The control unit 119 instructs the packet transmission unit 109 to transmit a packet at the transmission rate which is calculated by the transmission rate calculation unit 117.

The call monitoring unit 121 monitors the situation of the connection with the communication terminal with which the transmission terminal X1 communicates through the network N. The call monitoring unit 121 determines whether or not there is a possibility that the bandwidth which is available in the communication with the reception terminal Y1 is rapidly changed. If it is determined that the bandwidth is rapidly changed, the call monitoring unit 121 controls the change method determination unit 123 which will be described below, so as to operate. Specifically, it is determined that the available bandwidth is rapidly changed, by using, as a trigger, addition or deletion of a terminal of a call connection destination, or a rapid change of the RTT. As described in the paragraph of the background art, in the case where the RTT is rapidly shortened or increased by a reason such as switching of a communication channel when a communication with a terminal of an overseas network is ended or started, for example, it is determined that the available bandwidth is rapidly changed.

The change method determination unit 123 determines a change policy CP on the basis of the maximum value (hereinafter, referred to as "past transmission rate") Xp of the transmission rate contained in the history of the communication with the reception terminal Y1 which is recorded in the communication history storage unit 115, and the current transmission rate. The past transmission rate is not restricted to the maximum value of the transmission rate, and may be the average value. Alternatively, the past transmission rate may be the maximum or average value of the loss event rates contained in the history of the communication with the reception terminal Y1 which are recorded in the communication history storage unit 115. Alternatively, the past transmission rate may be obtained by substituting the round-trip delay time (RTT) and the like calculated by the RTT calculation unit 113, into Expression (1).

The change policy CP indicates the manner of a change from the current transmission rate to the past transmission rate Xp. A linear change of the bit rate is expressed as a change policy CP_PROP. For example, a linear change of the bit rate is a change in which the transmission rate is step-wisely increased or decreased for each RTT. A steady change of the bit rate is expressed as a change policy CP_CBR. If the change mode of the bit rate in the case where the transmission rate is increased differs from that in the case where the transmission rate is decreased, the change is expressed as a change policy CP_AIMD. For example, a change of the bit rate in different modes indicates a change in which, in the case where the transmission rate is increased, the change policy CP_CBR is applied, and, in the case where the transmission rate is decreased, the change policy CP_PROP is applied.

In accordance with the difference between the current transmission rate and the past transmission rate Xp, the change method determination unit 123 determines one policy from the three change policies CP. When the difference is larger than a predetermined value, for example, the change method determination unit 123 selects the change policy CP_PROP, and, when the difference is equal to or smaller than the predetermined value, selects the change policy CP_CBR. Alternatively, the change method determination unit 123 may determine a preset change policy.

In accordance with the sign of the value which is obtained by subtracting the current transmission rate from the past transmission rate Xp, the change method determination unit 123 determines a time period Tr required for changing from the current transmission rate to the past transmission rate Xp. In the case where the sign of the value is positive, or the transmission rate is increased, the change method determination unit 123 sets n times (n is a positive integer and a constant) of the round-trip delay time R which is calculated by the RTT calculation unit 113, as the required time period Tr. By contrast, in the case where the sign of the value is negative, or the transmission rate is decreased, the change method determination unit 123 sets log(n) times of the round-trip delay time R, as the required time period Tr.

The temporary transmission rate notification unit 125 transmits the past transmission rate Xp which is read from the communication history storage unit 115, the change policy CP which is determined by the change method determination unit 123, and the required time period Tr, to the reception terminal Y1. The temporary transmission rate notification unit 125 further transmits information related to the round-trip delay time R which is calculated by the RTT calculation unit 113, to the reception terminal Y1.

The ARQ unit 127 receives a retransmission request (NAK) of the RTP packet which is transmitted from the reception terminal Y1. When the packet indicated by the received NAK is accumulated in the buffer 107, the ARQ unit 127 instructs the packet transmission unit 109 to retransmit the packet to the reception terminal Y1.

Figure 3:
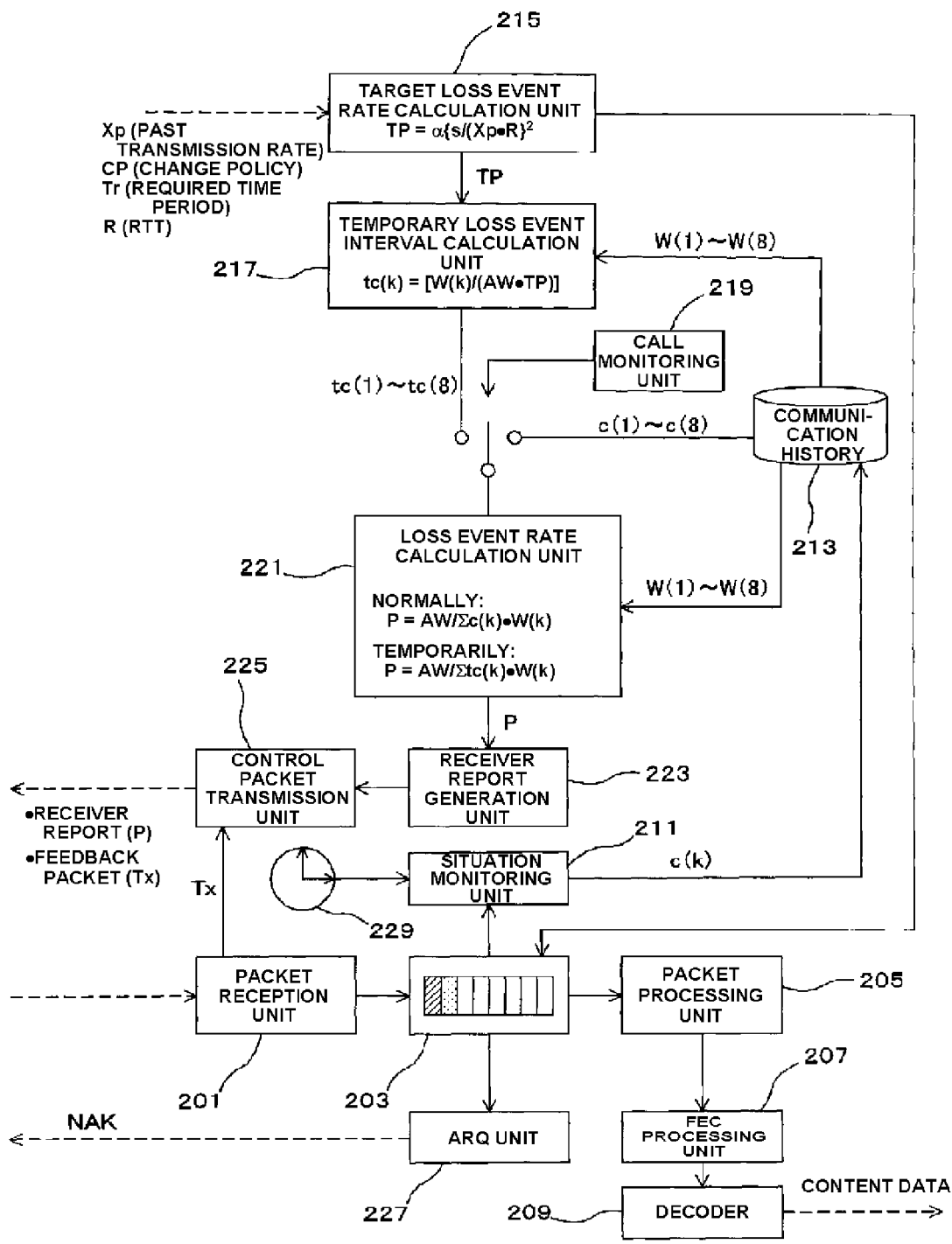
FIG. 3 is a block diagram showing the internal configuration of the reception terminal Y1 in the first embodiment.

FIG. 3 is a block diagram showing the internal configuration of the reception terminal Y1 in the first embodiment. As shown in FIG. 3, the reception terminal Y1 in the first embodiment includes a packet reception unit 201, a buffer 203, a packet processing unit 205, a redundant code processing unit (FEC processing unit) 207, a decoder 209, a situation monitoring unit 211, a communication history storage unit 213, a target loss event rate calculation unit 215, a temporary loss event interval calculation unit 217, a call monitoring unit 219, a loss event rate calculation unit 221, a receiver report generation unit 223, a control packet transmission unit 225, an ARQ unit 227, and a clock 229.

The packet reception unit 201 receives the packet which is transmitted from the transmission terminal X through the network N. The buffer 203 temporarily accumulates the packet which is received by the packet reception unit 201. The packet processing unit 205 reads the packet from the buffer 203, and extracts encoded content data and the redundant code. The redundant code processing unit 207 periodically performs error detection or error correction on the encoded content data, by using the read redundant code. The decoder 209 decodes the encoded content data which have been subjected to error detection or error correction.

Figure 8:
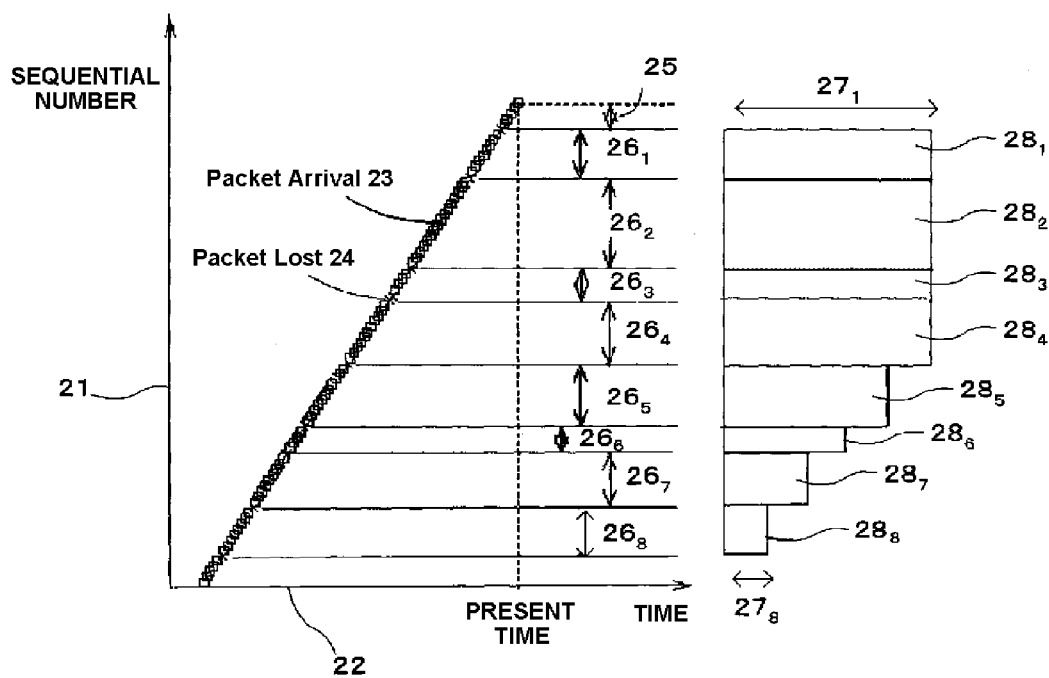
FIG. 8 is a graph showing a method which is disclosed in Non-Patent Literature 2, and in which the loss event rate is calculated by using the history of past loss events.
Figure 9:
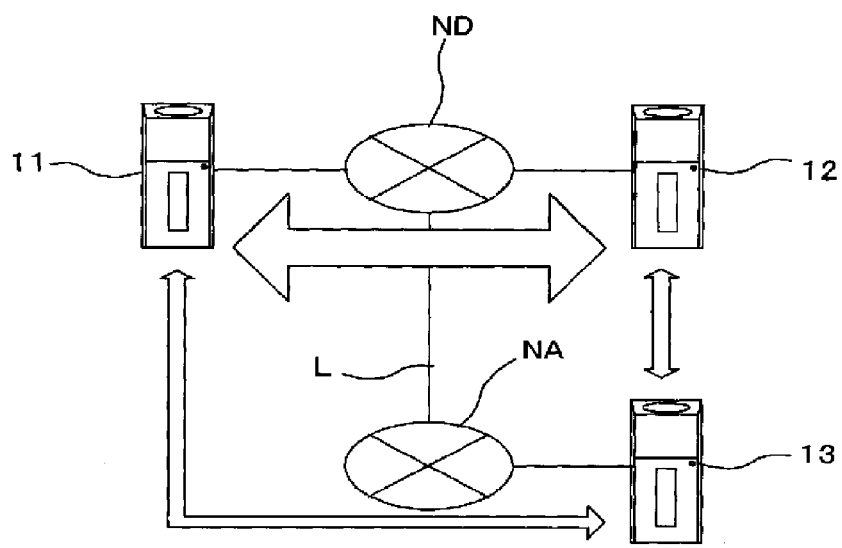
FIG. 9 shows an example of the configuration of a video conference system which uses a best effort network.

The situation monitoring unit 211 monitors the arrival situation of the packet which is transmitted from the transmission terminal X1, on the basis of packets accumulated in the buffer 203 by using a function of detecting the occurrence of the loss event specified in RFC 3448 which is shown in Non-Patent Literature 1. The situation monitoring unit 211 records the loss event interval c(k) which is obtained from the time when the loss event occurs, and the sequential number at the time, into the communication history storage unit 213. The time when the loss event occurs is obtained from the clock 229 which is included in the reception terminal Y1. FIG. 8 which has been described in the paragraphs of the background art is also a graph showing an example of the history of loss events in the reception terminal Y1.

The communication history storage unit 213 memorizes the loss event interval c(k) which is output from the situation monitoring unit 211, as the communication history for each of the communication terminals. The communication history storage unit 213 memorizes information of weights W(1) to W(8) of eight generations which are used in the temporary loss event interval calculation unit 217 and the loss event rate calculation unit 221. The weights are identical with the weights $27_1$ to $27_8$ shown in FIG. 8.

The target loss event rate calculation unit 215 calculates a target loss event rate TP by using Expression (2) below from the past transmission rate Xp, the round-trip delay time (RTT), and the like which are sent from the transmission terminal X1. In the case of the change policy CP_PROP which shows a linear change of the bit rate, a transmission rate between the current transmission rate and the past transmission rate Xp is used as the parameter Xp which is to be substituted into Expression (2) below.

$$TP=\alpha\{s/(Xp \cdot R)\}^2 \quad (2)$$

In Expression (2) above, $\alpha$ is an adjustment parameter, s is the packet size [byte], R is the RTT [sec.] which is sent from the transmission terminal X1, and Xp is the past transmission rate [bps] which is sent from the transmission terminal X1.

The temporary loss event interval calculation unit 217 calculates temporary loss event intervals tc(1) to tc(8) of eight generations by Expression (3) by using the calculated target loss event rate TP and the weights W(1) to W(8) of eight generations. The temporary loss event interval calculation unit 217 reads the weights W(1) to W(8) of eight generations from the communication history storage unit 213.

$$tc(k)=[W(k)/(AW \cdot TP)] \quad (3)$$

In Expression (3) above, tc(k) is the temporary loss event interval of a k-th generation. W(k) is the weight allocated to the k-th generation, and AW is the total of the weights W(1) to W(8) allocated to the first to eighth generations. The symbol of [ ] in Expression (3) is a Gauss symbol (or a floor function), and [x] indicates the maximum integer which is equal to or smaller than a real number x.

The call monitoring unit 219 monitors the situation of the connection with the communication terminal with which the reception terminal Y1 communicates through the network N. The call monitoring unit 219 determines whether or not there is a possibility that the bandwidth which is available in the communication with the transmission terminal X1 is rapidly changed. If it is determined that the bandwidth is rapidly changed, the call monitoring unit 219 switches the loss event interval used by the loss event rate calculation unit 221 which will be described below.

The loss event rate calculation unit 221 calculates the reciprocal of a weighted loss event interval which is obtained by weighted averaging the loss event intervals of eight generations, as the loss event rate P. The loss event intervals of eight generations which are used as one of parameters by the loss event rate calculation unit 221 are loss event intervals c(1) to c(8) of eight generations which are recorded in the communication history storage unit 213. The loss event intervals of eight generations are the temporary loss event intervals tc(1) to tc(8) of eight generations which are calculated by the temporary loss event interval calculation unit 217. The weights W(1) to W(8) of eight generations are read from the communication history storage unit 213.

Usually, the loss event rate calculation unit 221 calculates the loss event rate P by using the loss event intervals c(1) to c(8) of eight generations which are recorded in the communication history storage unit 213. If the call monitoring unit 219 determines that the bandwidth which is available in the communication with the transmission terminal X1 is rapidly changed, however, the temporary loss event intervals tc(1) to tc(8) of eight generations which are calculated by the temporary loss event interval calculation unit 217 are used. Therefore, the expression of calculating the loss event rate in the normal situation is Expression (4) below, and that of calculating the loss event rate in the case where the bandwidth is rapidly changed is Expression (5) below.

[Exp. 2]

$$P = \frac{AW}{\sum_{k=1}^{8} t(k) \times W(k)} \quad (4)$$

$$P = \frac{AW}{\sum_{k=1}^{8} tc(k) \times W(k)} \quad (5)$$

The receiver report generation unit 223 generates a receiver report containing the loss event rate P which is calculated by the loss event rate calculation unit 221. The control packet transmission unit 225 transmits the receiver report generated by the receiver report generation unit 223, to the transmission terminal X1 in the form of an RTCP packet each time when a loss event occurs or in a periodical manner (for example, at each RTT). In accordance with the packet containing the transmission time Tx transmitted from the transmission terminal X1, furthermore, the control packet transmission unit 225 transmits a feedback packet to which information indicative of the transmission time Tx is added, to the transmission terminal X1.

The ARQ unit 227 detects the loss of the RTP packet transmitted from the transmission terminal X1, from the gaps of the sequential numbers of packets accumulated in the buffer 203. The ARQ unit 227 transmits a retransmission request (NAK) of the detected loss packet to the transmission terminal X1, registers the retransmission requesting process, and counts the time. When the time count is larger than the time of the round-trip between the transmission terminal X1 and the reception terminal Y1, the ARQ unit 227 retransmits the retransmission request, registers the retransmission requesting process, and again counts the time. When the loss packet is received from the transmission terminal X1 in accordance with the NAK which is transmitted for a predetermined time period, the ARQ unit 227 stops the time count, and cancels the registered retransmission requesting process.

Figure 4:
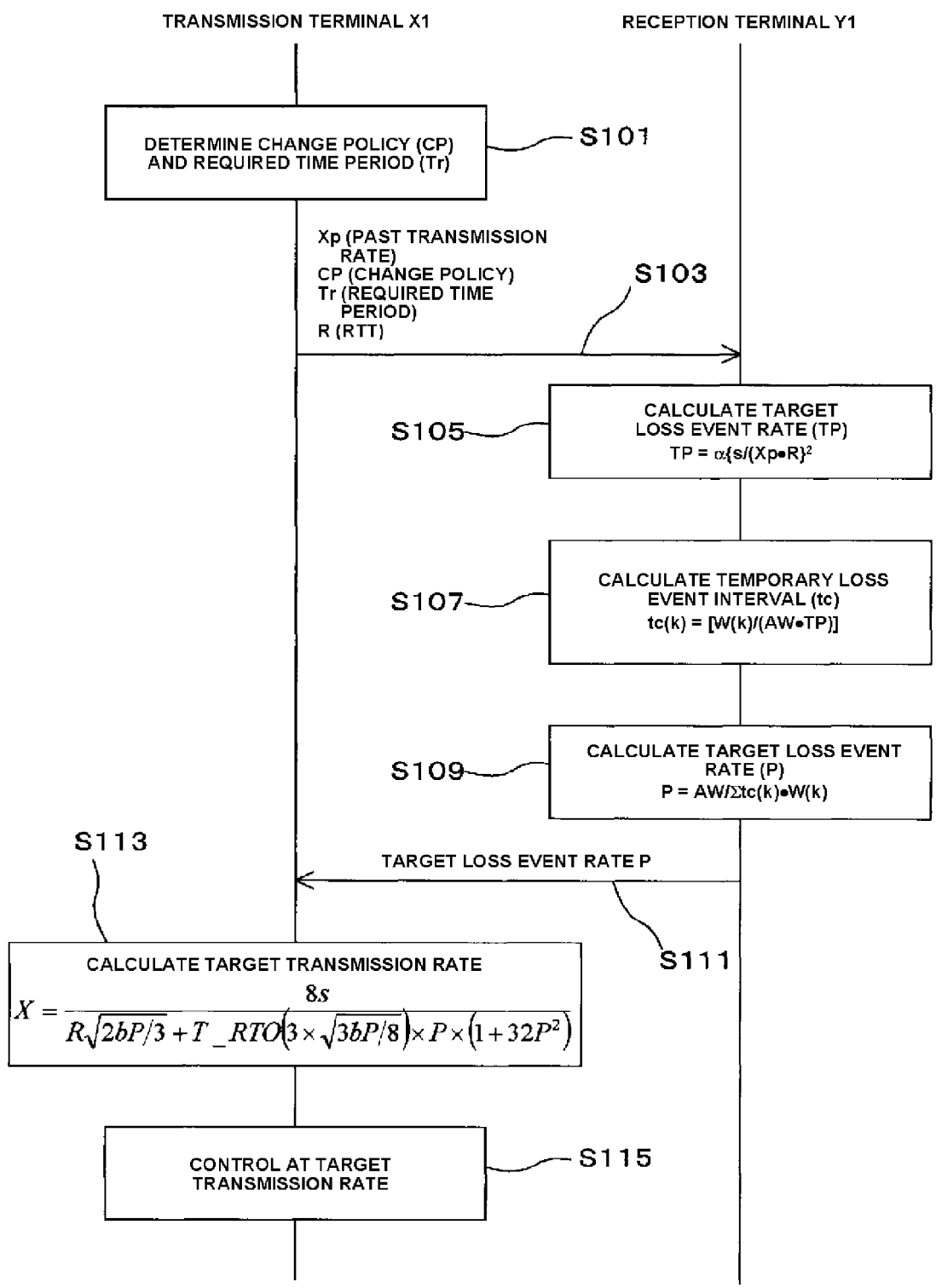
FIG. 4 is a timing chart showing a process which, in the communication system of the first embodiment, is performed when the bandwidth that is available in a communication between the transmission and reception terminals is rapidly changed.

Hereinafter, in the communication system of the first embodiment, a process to be performed when the bandwidth which is available in the communication between the transmission and reception terminals is rapidly changed will be described in detail with reference to FIG. 4. FIG. 4 is a timing chart showing the process which, in the communication system of the first embodiment, is performed when it is determined that the bandwidth that is available in a communication between the transmission and reception terminals is rapidly changed.

First, the change method determination unit 123 of the transmission terminal X1 determines the change policy CP and the required time period Tr (step S101). Next, the temporary transmission rate notification unit 125 transmits information relating to the past transmission rate Xp, the change policy CP, the required time period Tr, and the round-trip delay time (RTT) R, to the reception terminal Y1 (step S103). In the reception terminal Y1 which receives this information, the target loss event rate calculation unit 215 calculates the target loss event rate TP (step S105). Next, the temporary loss event interval calculation unit 217 calculates the temporary loss event intervals tc(1) to tc(8) of eight generations (step S107). Next, the loss event rate calculation unit 221 calculates the target loss event rate P from the temporary loss event intervals tc(1) to tc(8) of eight generations which are calculated in step S107, and the weights W(1) to W(8) of eight generations (step S109). The target loss event rate P which is calculated in step S109 is transmitted to the transmission terminal X1 (step S111).

In the transmission terminal X1 which receives the target loss event rate P, the transmission rate calculation unit 117 calculates the target transmission rate by using the target loss event rate P, the round-trip delay time (RTT) R, and the like (step S113). Next, the control unit 119 changes the transmission rate so as to transmit packets at the target transmission rate which is calculated in step S113 (step S115).

As described above, in the communication system of the embodiment, when it is determined that the bandwidth which is available in the communication between the transmission and reception terminals is rapidly changed, the history of the loss event interval is generated from transmission rates which have been realized in past times, and then the control of the transmission rate using the TFRC is performed. As described in the paragraph of the background art, in the transmission rate control using the TFRC based on the actual loss event interval, the transmission rate is smoothly changed. In the conventional transmission rate control, therefore, the transmission rate cannot be immediately changed from a low bit rate to a high bit rate or from a high bit rate to a low bit rate. In the embodiment, by contrast, the history of the generated loss event interval is used as described above, and hence the transmission rate can be changed to a target bit rate in a short time period.

The best effort network in which the communication system of the embodiment is used may be a wired network or a wireless network.

The case where a communication with a wireless terminal which can perform only a communication at a low bit rate is ended may be a possible cause of a rapid change of the bandwidth which is available in the communication between the transmission and reception terminals. Even in such a use case, however, the communication system of the embodiment can change the transmission rate to a target bit rate in a short time period.

Second Embodiment

Figure 5:
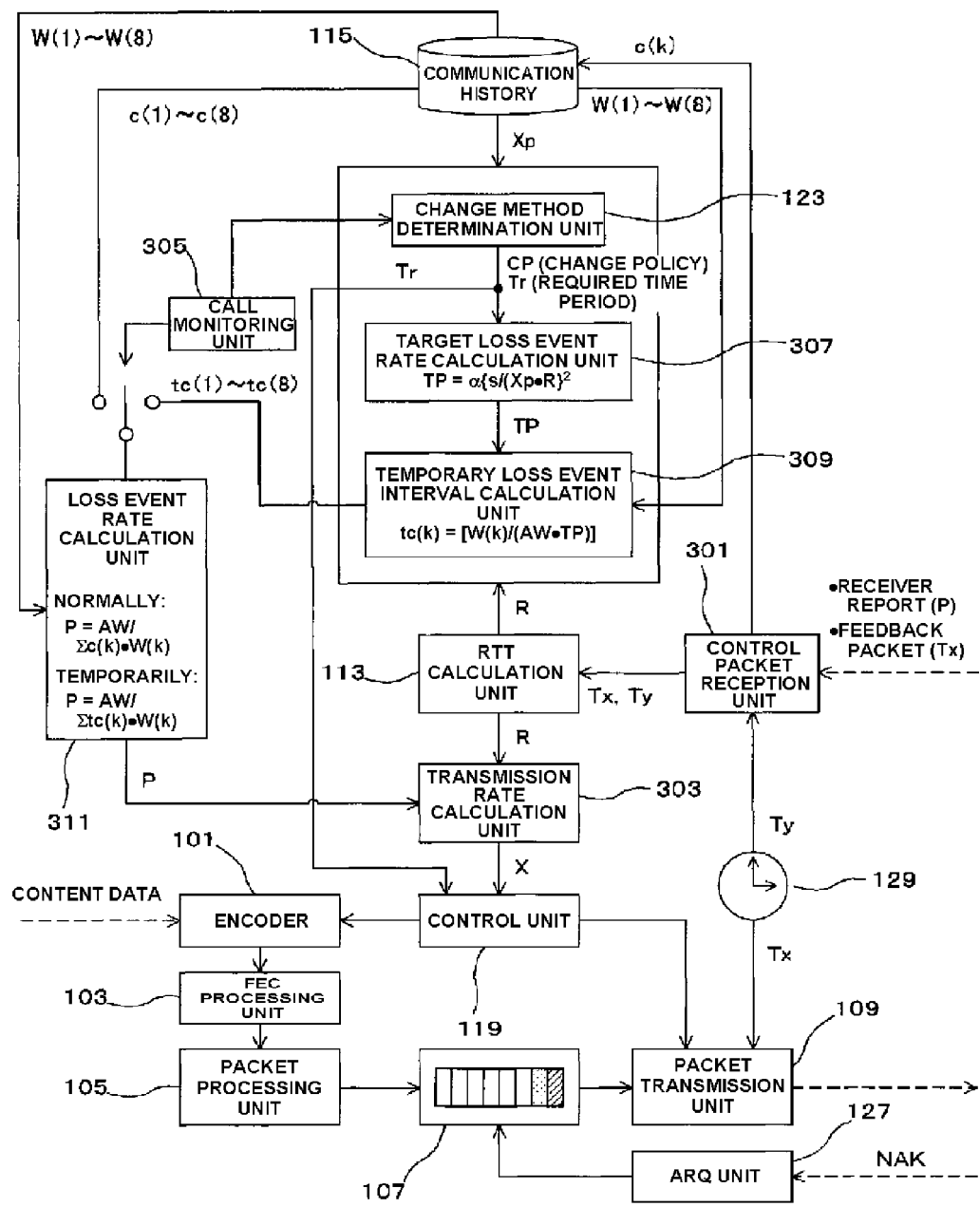
FIG. 5 is a block diagram showing the internal configuration of the transmission terminal X2 in a second embodiment.

FIG. 5 is a block diagram showing the internal configuration of the transmission terminal X2 in a second embodiment. The transmission terminal X2 in FIG. 5 includes the encoder 101, the redundant code processing unit (FEC processing unit) 103, the packet processing unit 105, the buffer 107, the packet transmission unit 109, a control packet reception unit 301, the RTT calculation unit 113, the communication history storage unit 115, a transmission rate calculation unit 303, the control unit 119, a call monitoring unit 305, the change method determination unit 123, a target loss event rate calculation unit 307, a temporary loss event interval calculation unit 309, a loss event rate calculation unit 311, the ARQ unit 127, and the clock 129. In FIG. 5, the components which are common to FIG. 2 showing the transmission terminal X1 in the first embodiment are denoted by the same reference numerals.

The target loss event rate calculation unit 307, the temporary loss event interval calculation unit 309, and the loss event rate calculation unit 311 which are included in the transmission terminal X2 are identical with the functions which are included in the reception terminal Y1 shown in FIG. 3 that has been described in the first embodiment. The calculation of the loss event rate is performed in the side of the reception terminal Y1 in the first embodiment, whereas, in the second embodiment, the calculation is performed in the side of the transmission terminal X2.

However, the receiver report which is received by the control packet reception unit 301 in the embodiment contains the loss event interval c(k) in place of the loss event rate P. The loss event interval c(k) is recorded in the communication history storage unit 115. In the embodiment, as described above, the receiver report does not contain the loss event rate P. The loss event rate P is calculated by the loss event rate calculation unit 311 which is included in the transmission terminal X2. Therefore, the value which is substituted into the loss event rate P that is one of the parameters of Expression (1) by the transmission rate calculation unit 303 in the embodiment is a value calculated by the loss event rate calculation unit 311.

The call monitoring unit 305 which is included in the transmission terminal X2 monitors the situation of the connection with communication terminals with which the transmission terminal X2 communicates through the network N. The call monitoring unit 305 determines whether or not the bandwidth which is available in the communication with the reception terminal Y2 is rapidly changed. If the bandwidth is rapidly changed, the call monitoring unit 305 controls the change method determination unit 123 so as to operate, and switches the loss event interval used by the loss event rate calculation unit 311.

Figure 6:
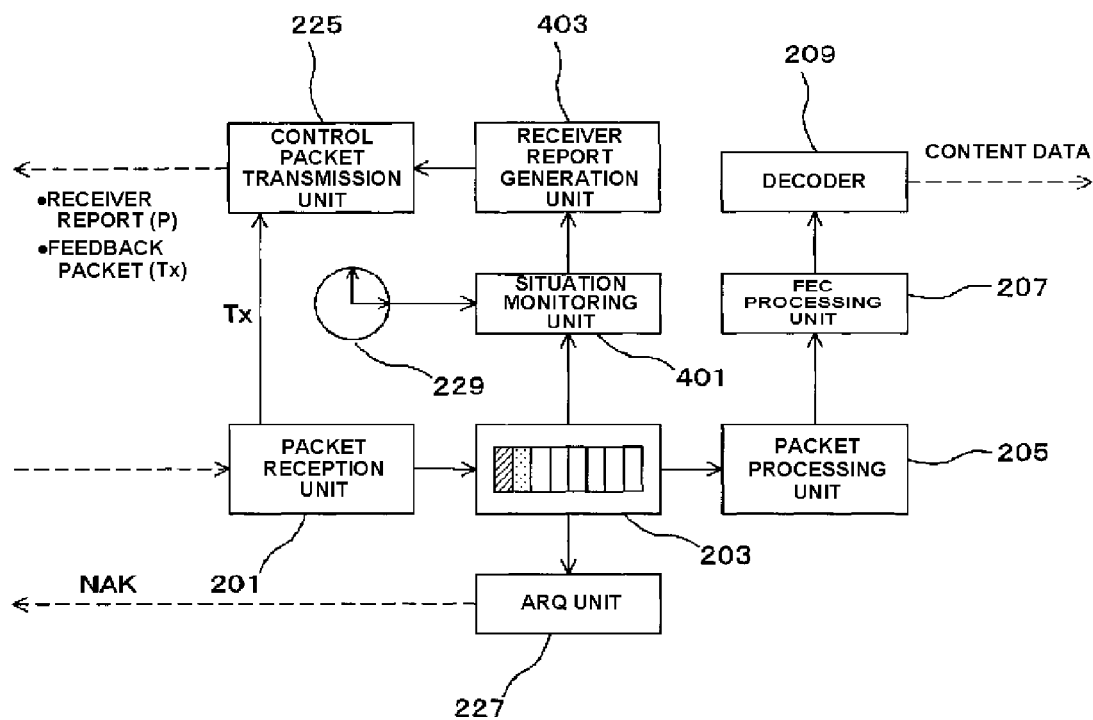
FIG. 6 is a block diagram showing the internal configuration of the reception terminal Y2 in the second embodiment.

FIG. 6 is a block diagram showing the internal configuration of the reception terminal Y2 in the second embodiment. The reception terminal Y2 in FIG. 6 includes the packet reception unit 201, the buffer 203, the packet processing unit 205, the redundant code processing unit (FEC processing unit) 207, the decoder 209, a situation monitoring unit 401, a receiver report generation unit 403, the control packet transmission unit 225, the ARQ unit 227, and the clock 229. In FIG. 6, the components which are common to FIG. 3 showing the reception terminal Y1 in the first embodiment are denoted by the same reference numerals.

Similarly with the first embodiment, the situation monitoring unit 401 which is included in the reception terminal Y2 monitors the arrival situation of the packet which is transmitted from the transmission terminal X2, on the basis of packets accumulated in the buffer 203. However, the situation monitoring unit 401 in the embodiment sends the loss event interval c(k) which is obtained from the time when the loss event occurs, and the sequential number at the time, to the receiver report generation unit 403. The receiver report generation unit 403 which is included in the reception terminal Y2 generates a receiver report containing the loss event interval c(k) that is obtained from the situation monitoring unit 401.

Figure 7:
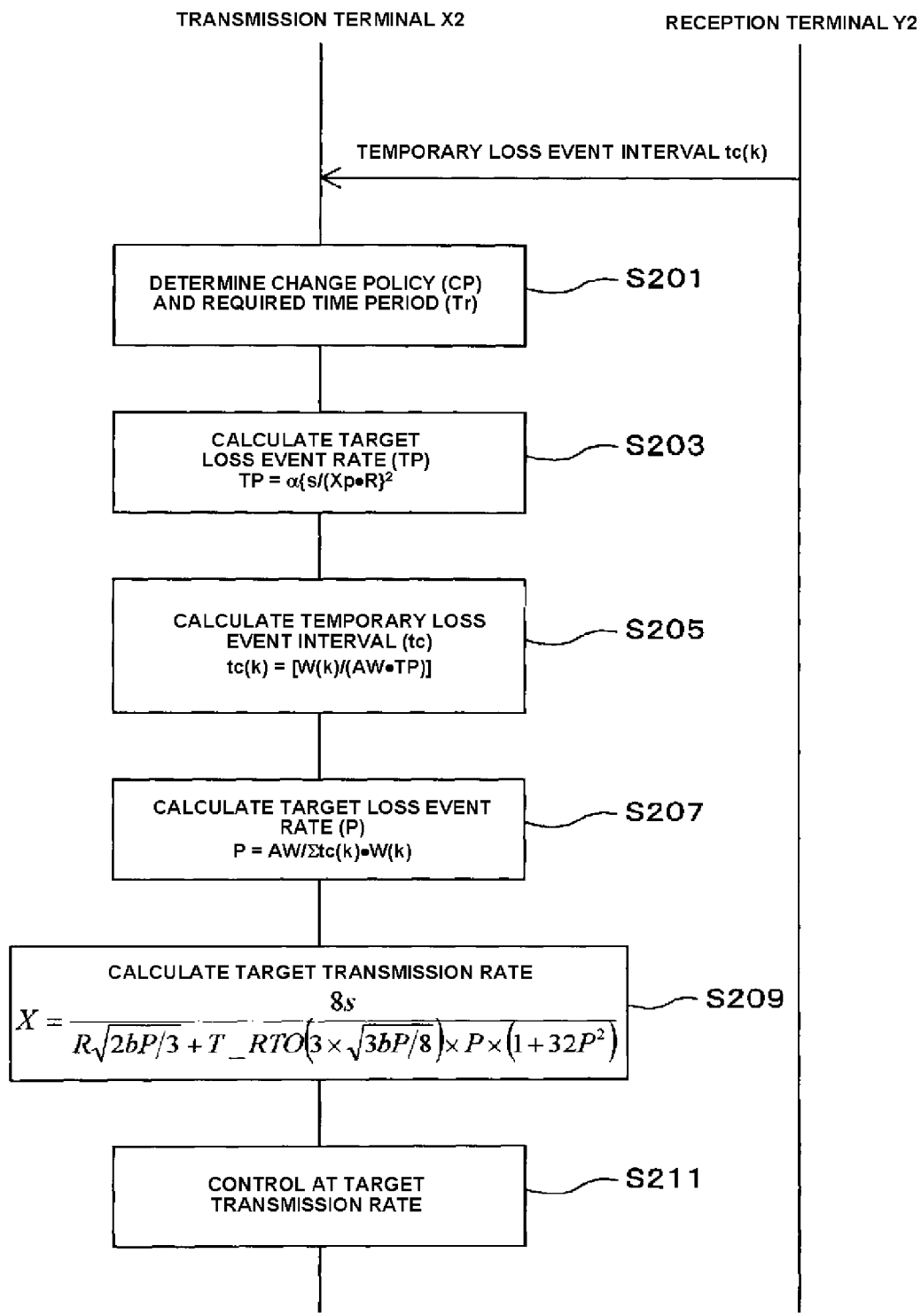
FIG. 7 is a timing chart showing a process which, in the communication system of the second embodiment, is performed when the bandwidth that is available in a communication between the transmission and reception terminals is rapidly changed.

Hereinafter, in the communication system of the second embodiment, a process to be performed when the bandwidth which is available in the communication between the transmission and reception terminals is rapidly changed will be described in detail with reference to FIG. 7. FIG. 7 is a timing chart showing a process which, in the communication system of the second embodiment, is performed when it is determined that the bandwidth that is available in a communication between the transmission and reception terminals is rapidly changed.

First, the change method determination unit 123 of the transmission terminal X2 determines the change policy CP and the required time period Tr (step S201). Next, the target loss event rate calculation unit 307 calculates the target loss event rate TP (step S203). Next, the temporary loss event interval calculation unit 309 calculates the temporary loss event intervals tc(1) to tc(8) of eight generations (step S205).

Next, the loss event rate calculation unit 311 calculates the target loss event rate P from the temporary loss event intervals tc(1) to tc(8) of eight generations which are calculated in step S205, and the weights W(1) to W(8) of eight generations (step S207). Next, the transmission rate calculation unit 303 calculates the target transmission rate by using the target loss event rate P, the round-trip delay time (RTT) R, and the like (step S209). Next, the control unit 119 changes the transmission rate so as to transmit packets at the target transmission rate which is calculated in step S113 (step S211).

As described above, in the communication system of the embodiment, in a similar manner as the first embodiment, when it is determined that the bandwidth which is available in the communication between the transmission and reception terminals is rapidly changed, the history of the loss event interval is generated from transmission rates which have been realized in past times, and then the control of the transmission rate using the TFRC is performed. Therefore, the transmission rate can be changed to a target bit rate in a short time period.

Third Embodiment

The transmission terminals X1, X2 in the above-described embodiments include the redundant code processing unit 103 and the ARQ unit 127, and the reception terminals Y1, Y2 include the redundant code processing unit 207 and the ARQ unit 227. As described above, the redundant code processing unit 103 which is provided in the transmission terminals X1, X2 generates a redundant code from encoded content data, adds the redundant code to the encoded content data, and outputs the addition result. The redundant code processing unit 207 of the reception terminals Y1, Y2 periodically performs error detection or error correction on the encoded content data, by using the read redundant code.

By contrast, the ARQ unit 227 which is included in the transmission terminals X1, X2 receives the retransmission request (NAK) of the RTP packet which is transmitted from the reception terminals Y1, Y2. When the packet indicated by the received NAK is accumulated in the buffer 107, the ARQ unit 127 instructs the packet transmission unit 109 to retransmit the packet to the reception terminals Y1, Y2. The ARQ unit 227 which is included in the reception terminals Y1, Y2 detects the loss of the RTP packet transmitted from the transmission terminals X1, X2, from the gaps of the sequential numbers of packets accumulated in the buffer 203. The ARQ unit 227 transmits a retransmission request (NAK) of the detected loss packet to the transmission terminals X1, X2, registers the retransmission requesting process, and counts the time. When the time count is larger than the time of the round-trip between the transmission terminal X1 and the reception terminal Y1, or that of the round-trip between the transmission terminal X2 and the reception terminal Y2, the ARQ unit 227 retransmits the retransmission request. Furthermore, the ARQ unit 227 registers the retransmission requesting process, and again counts the time. When the loss packet transmitted from the transmission terminals X1, X2 in accordance with the NAK which is transmitted for a predetermined time period is received, the ARQ unit 227 stops the time count, and cancels the registered retransmission requesting process.

In the third embodiment, in the redundant code generation which is performed by the redundant code processing unit 103 of the transmission terminals X1, X2, the redundant code processing unit 103 changes the length of the redundant code with respect to the content data amount in accordance with instructions from the control unit 119. In the third embodiment, hereinafter, the length of the redundant code with respect to the content data amount is described as "redundant code strength". In the case where the redundant code strength is 25%, for example, the redundant code processing unit 103 generates a redundant code the length of which is ¼ of the content data amount. Furthermore, the increase of the redundant code strength means that, for example, the redundant code strength is changed from 25% to 50%.

In the embodiment, the call monitoring units 121, 305 of the transmission terminals X1, X2 determine that the bandwidth which is available in the communication with the reception terminals Y1, Y2 is rapidly changed. If the call monitoring units 121, 305 determine that the bandwidth is rapidly changed, the control unit 119 instructs the redundant code processing unit 103 to generate the redundant code at a redundant code strength which is different from a normal one. The redundant code strength in this case may be increased or decreased in accordance with the control of the change policy CP and the transmission rate. After the required time period Tr determined by the change method determination unit 123 has elapsed, the control unit 119 instructs the redundant code processing unit 103 to return the redundant code strength to its original value.

When the transmission rate is rapidly increased, the occurrence probability of the packet loss is increased. During the required time period Tr, however, the support for occurrence of the packet loss can be enhanced by increasing the redundant code strength. On the contrary, when the transmission rate is rapidly decreased, the occurrence probability of the packet loss is decreased, and hence the redundant code strength is reduced. When the redundant code strength is reduced, the generation process amount of the redundant code is reduced, and hence a high speed process of the redundant code generation by the redundant code processing unit 103 is enabled.

In the third embodiment, the target loss event rate calculation unit 215 of the reception terminal Y1 receives the change policy CP. When received, the target loss event rate calculation unit 215 changes the time period (reception allowable delay time period) when packets are temporarily accumulated into the buffer 203 of the reception terminal Y1, during the required time period Tr. In the case where the change policy CP in which the transmission rate is rapidly increased is received, the occurrence probability of the packet loss is increased, and hence the target loss event rate calculation unit 215 lengthens the reception allowable delay time period so that the chance that the reception terminal Y1 requests the transmission terminal X1 to perform retransmission is increased. Therefore, retransmission is performed a plurality of times, and the support for occurrence of the packet loss can be enhanced. On the contrary, when the transmission rate is rapidly decreased, the occurrence probability of the packet loss is decreased, and the necessity that the reception terminal Y1 requests a plurality of times the transmission terminal X1 to perform retransmission is reduced, so that the reception allowable delay time period is shortened. The ARQ unit 227 lengthens or shortens the reception allowable delay time period in multiples of the round-trip delay time (RTT). The lengthened or shortened width of the reception allowable delay time period may be always set to a fixed multiple of the round-trip delay time (RTT), or may be changed in accordance with the difference between the current transmission rate and the past transmission rate Xp, or the like.

Although the invention has been described in detail and with reference to the specific embodiments, it is obvious to those skilled in the art that various changes and modifications can be made without departing from the spirit and scope of the invention.

The application is based on Japanese Patent Application (No. 2008-240986) filed on Sep. 19, 2008, and its content is incorporated herein by reference.

INDUSTRIAL APPLICABILITY

The transmission rate control device of the invention is useful as a communication terminal or the like in which, when the bandwidth that is estimated to be available in a communication through a network is rapidly changed, the transmission rate can be changed to a target bit rate in a short time period.

REFERENCE SIGNS LIST

X1, X2 transmission terminal
Y1, Y2 reception terminal
N best effort network
101 encoder
103 redundant code processing unit (FEC processing unit)
105 packet processing unit
107 buffer
109 packet transmission unit
111, 301 control packet reception unit
113 RTT calculation unit
115 communication history storage unit
117, 303 transmission rate calculation unit
119 control unit
121, 305 call monitoring unit
123 change method determination unit
125 temporary transmission rate notification unit
127 ARQ unit
129 clock
201 packet reception unit
203 buffer
205 packet processing unit
207 redundant code processing unit (FEC processing unit)
209 decoder
211, 401 situation monitoring unit
213 communication history storage unit
215, 307 target loss event rate calculation unit
217, 309 temporary loss event interval calculation unit
219 call monitoring unit
221, 311 loss event rate calculation unit
223, 403 receiver report generation unit
225 control packet transmission unit
227 ARQ unit
229 clock

The invention claimed is:

1. A transmission rate control method which is performed in a transmission rate control system that controls a transmission rate in accordance with a bandwidth that is estimated to be available in a communication between two communication terminals through a best effort network, transmission rate control method comprising:
   calculating, by a first communication terminal which communicates with a second communication terminal through the network, a round-trip delay time that occurs in the communication with the second communication terminal through the network;
   calculating, by the second communication terminal, a target loss event rate, when the bandwidth available in the communication is estimated to be changing, based on a past transmission rate, reported by the first communication terminal, that has been previously realized in the communication with the second communication terminal and on a round-trip delay time calculated by the first communication terminal;
   calculating, by the second communication terminal, an actual loss event rate when the bandwidth available in the communication is estimated to not be changing, the actual loss event rate being based on monitored loss event intervals;
   calculating, by the first communication terminal, a target transmission rate based on one of the target loss event rate or the actual loss event rate calculated by the second communication terminal, and the round-trip delay time, wherein calculation based on the one of the target loss event rate or the actual loss event rate is based on whether the bandwidth available is estimated to be changing or not, respectively; and
   controlling, by the first communication terminal, the transmission rate to be changed from a transmission rate which is set at a present time to the target transmission rate.

2. A transmission rate control method which controls a transmission rate in accordance with a bandwidth that is estimated to be available in a communication through a best effort network, the transmission rate control method comprising:
   Calculating, by a first communication terminal, a round-trip delay time that occurs in the communication with a communication terminal through the network;
   calculating a target transmission rate to be set in a communication with a predetermined communication terminal, the target transmission rate being based on a past transmission rate that has been previously realized in a communication with the predetermined communication terminal and on the round-trip delay time that occurs in the communication with the predetermined communication terminal when a bandwidth available in the communication is estimated to be changing, and the target transmission rate being based at least on an actual loss event rate that occurs in the communication and the round-trip delay time when the bandwidth available in the communication is estimated to not be changing; and changing a transmission rate which is set at a present time to the target transmission rate.

3. The transmission rate control method of claim 1, wherein calculating the target loss event rate comprises:
   calculating a predetermined number of target loss event intervals based on the past transmission rate realized in the communication and on the round-trip delay time; and
   setting a reciprocal of a weighted average of the predetermined number of target loss event intervals using weights which are allocated to the predetermined number of target loss event intervals, as the target loss event rate.

4. The transmission rate control method of claim 1, wherein the past transmission rate is a maximum value of transmission rates that have been realized in the communication with the second communication terminal.

5. The transmission rate control method of claim 1, further comprising determining, by the first communication terminal, a time period which is required to change the transmission rate from the transmission rate which is set at the present time to the target transmission rate in accordance with a sign of a difference between the past transmission rate and the transmission rate which is set at the present time.

6. The transmission rate control method of claim 5, wherein determining comprises determining the time period as n times the round-trip delay time, where n is a positive integer, when the past transmission rate is larger than the transmission rate which is set at the present time.

7. The transmission rate control method of claim 5, wherein determining comprises determining the time period as log(n) times of the round-trip delay time, where n is a positive integer, when the target transmission rate is smaller than the transmission rate which is set at the present time.

8. The transmission rate control method claim 5, wherein changing the transmission rate which is set at a present time to the target transmission rate comprises changing the transmission rate in proportion to an elapse of the required time period.

9. The transmission rate control method of claim 1, further comprising:
generating a redundant code from data to be transmitted to the second communication terminal in accordance with a predetermined redundant code strength; and
during a period of changing from the transmission rate which is set at the present time to the target transmission rate, generating the redundant code in accordance with a redundant code strength which is different from a redundant code strength before changing.

10. The transmission rate control method of claim 1, further comprising:
temporarily accumulating packets received through the network, by the second communication terminal, in a buffer; and
during a period of changing from the transmission rate which is set at the present time to the target transmission rate, temporarily accumulating packets in the buffer according to a storage time period that differs from a storage time period before changing.

11. The transmission rate control method of claim 2, wherein calculating the target transmission rate further comprises:
calculating a target loss event rate based on the past transmission rate that has been realized in the communication with the predetermined communication terminal and on the round-trip delay time that occurs in the communication with the predetermined communication terminal; and
calculating the target transmission rate based on the calculated target loss event rate and the round-trip delay time.

12. The transmission rate control method claim 11, wherein calculating the target loss event rate comprises:
calculating a predetermined number of target loss event intervals based on the past transmission rate realized in the communication and on the round-trip delay time; and
setting a reciprocal of a weighted average of the predetermined number of target loss event intervals using weights which are allocated to the predetermined number of target loss event intervals, as the target loss event rate.

13. The transmission rate control method claim 2, wherein the past transmission rate is a maximum value of transmission rates that have been realized in the communication with the predetermined communication terminal.

14. The transmission rate control method claim 2, further comprising determining a time period which is required to change the transmission rate from the transmission rate which is set at the present time to the target transmission rate in accordance with a sign of a difference between the past transmission rate and the transmission rate which is set at the present time.

15. The transmission rate control method of claim 14, wherein determining comprises determining the time period as n times the round-trip delay time, where n is a positive integer, when the past transmission rate is larger than the transmission rate which is set at the present time.

16. The transmission rate control method of claim 14, wherein determining comprises determining the time period as log(n) times of the round-trip delay time, where n is a positive integer, when the target transmission rate is smaller than the transmission rate which is set at the present time.

17. The transmission rate control method claim 14, wherein changing the transmission rate which is set at a present time to the target transmission rate comprises changing the transmission rate in proportion to an elapse of the required time period.

18. The transmission rate control method of claim 2, further comprising:
generating a redundant code from data to be transmitted to the second communication terminal in accordance with a predetermined redundant code strength; and
during a period of changing from the transmission rate which is set at the present time to the target transmission rate, generating the redundant code in accordance with a redundant code strength which is different from a redundant code strength before changing.

* * * * *